United States Patent [19]
Farfaletti-Casali

[11] 3,747,646
[45] July 24, 1973

[54] INSULATION OF GAS FEED TUBES
[75] Inventor: Flaviano Farfaletti-Casali, Milan, Italy
[73] Assignee: European Atomic Energy Community (Euratom), Kirchberg, Luxembourg
[22] Filed: Mar. 29, 1971
[21] Appl. No.: 128,685

[30] Foreign Application Priority Data
Apr. 22, 1970 Italy .............................. 50150 A/70

[52] U.S. Cl. .............................. 138/148, 138/114 X
[51] Int. Cl. .............................. F16l 9/18
[58] Field of Search .............. 138/148, 113, 114, 138/142, 112

[56] References Cited
UNITED STATES PATENTS
| | | | |
|---|---|---|---|
| 683,514 | 10/1901 | Stephens | 138/148 |
| 2,401,974 | 6/1946 | Siebels | 138/114 X |
| 2,794,319 | 6/1957 | Stackdale | 138/142 X |
| 1,577,495 | 3/1926 | Scharwath | 138/148 X |
| 1,677,714 | 7/1928 | Frease | 138/148 X |

FOREIGN PATENTS OR APPLICATIONS
555,176  8/1943  Great Britain ..................... 138/148

Primary Examiner—Herbert F. Ross
Attorney—Stevens, Davis, Miller & Mosher

[57] ABSTRACT

A heat insulation system for gas conduits in which open cylinders are placed side by side coaxially within the conduit. Each cylinder has an inner and outer wall, the gap between the walls being occupied by concentric metal layers which are so shaped and stacked that a number of longitudinal gaps are provided between any two metal layers. The gap is closed either at the upstream end of the cylinder or in the central zone.

11 Claims, 6 Drawing Figures

PATENTED JUL 24 1973 3,747,646
SHEET 1 OF 2
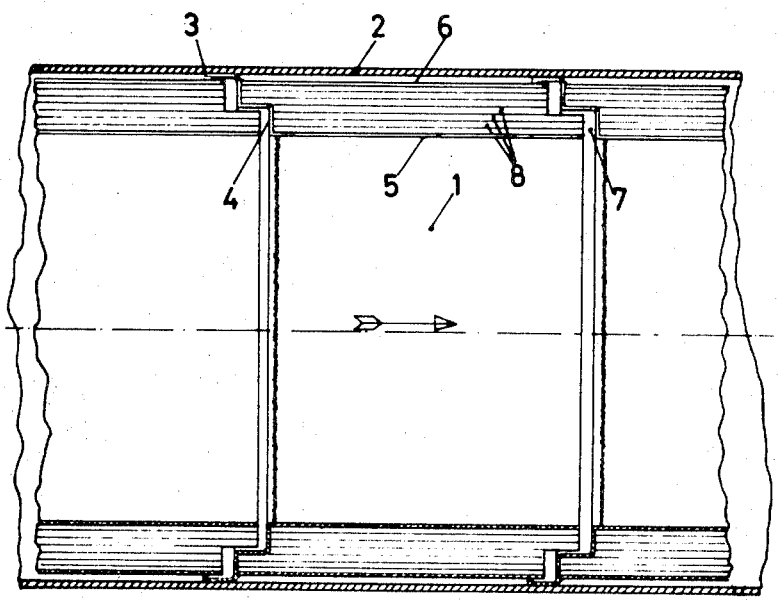
FIG 1.
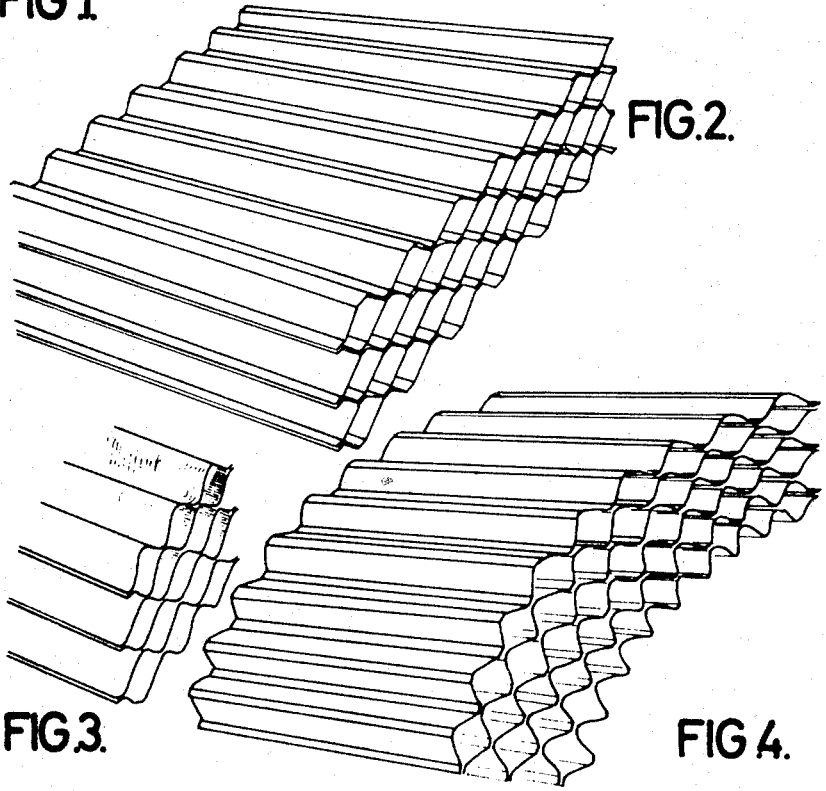
FIG.2.
FIG.3.
FIG 4.

INSULATION OF GAS FEED TUBES

BACKGROUND OF THE INVENTION

The invention relates to heat insulation systems for gas conduits, particularly to a system in which hot gas is led from the heating area to a heat exchanger and then returned to the heating area.

In a known arrangement, the gas flows and returns in concentric tubes, i.e. the gas flows at elevated temperature in the innermost tube, returning at a lower temperature in the gap between the outer and inner tubes. However, the problem arises of insulating the gas feed tube by means of an insulation system which must be placed inside the tube, to prevent its walls from reaching an excessive temperature. In view of the high velocities and pressures to which the gas may be subjected, problems arise in providing insulation which resists the pressurized gas an which does not suffer mechanical deterioration when the gas is rapidly depressurised.

SUMMARY OF THE INVENTION

According to the present invention there is provided a heat insulation system for a gas conduit, which comprises a plurality of inner conduits placed adjacent to one another within and substantially coaxial with the gas conduit, each of the inner conduits having an inner and an outer wall, the gap between said inner and outer walls partitioned into a plurality of longitudinal spaces, the spaces being closed to prevent free flow of gas through the gap between the walls from a position exterior of one end of the inner conduit to a position exterior of the other end of the inner conduit.

Normally the gas and inner conduits will be pipes having a circular cross-section. Each inner conduit may be welded separately to the gas conduit and is therefore independent of adjacent conduits, in relation to which it has axial clearance enabling longitudinal thermal expansions to be absorbed.

Preferably the gap between the walls of the inner conduit is partitioned by concentric layers of metal sheeting formed into a honeycomb structure. In a particularly preferred embodiment, the length of the honeycomb spaces in a circumferential direction is greater than the length in a radial direction.

The axial clearance between two inner conduits enables the system to be rapidly depressurised and the design is such that there is no adverse effect in gas circulation, while at the same time gas currents are prevented from infiltrating the inner conduits.

In the insulating system according to the invention, the inner conduits are so structured as to allow normal or emergency rapid gas depressurisation up to a depressurising rate of the order of 100 atmospheres per second, without the inner conduits being damaged in any way.

The longitudinal spaces or parallel cells each have the same length as the inner conduits, one end being closed to prevent infiltrations of the gaseous current, the other end being open to allow rapid depressurisation.

The insulating cells therefore have much larger longitudinal dimensions than transverse or diametric dimensions. Clearly, therefore, since each cell has the same length as the inner conduit, there is no need for partitions or baffles along the length of the inner conduit and therfore there are no obstacles to gas discharge during depressurisation.

According to one embodiment of the invention the cells are formed by layers of metal sheeting wound around the inner metal cylinder of the inner conduit and bounded by an outer metal cylinder, the inner conduits being internally welded to the tube along a cirumference and closed to match such welding, the or free end being open, profiled and spaced out from the adjacent inner conduits so as to allow the free discharge of the gas contained between the metal layers during the transitional conditions when the system is rapidly depressurised.

BRIEF DESCRIPTION OF THE DRAWING

By way of example, some embodiments of the invention will now be described with reference to the accompanying drawings, in which:

FIG. 1 is a section through the longitudinal axis of a gas conduit containing a heat insulation system according to the invention;

FIGS. 2 to 4 show various embodiments of the structured metal layers suitable for inclusion between the walls of the inner conduit;

DETAILED DESCRIPTION OF THE INVENTION

Figure 5:
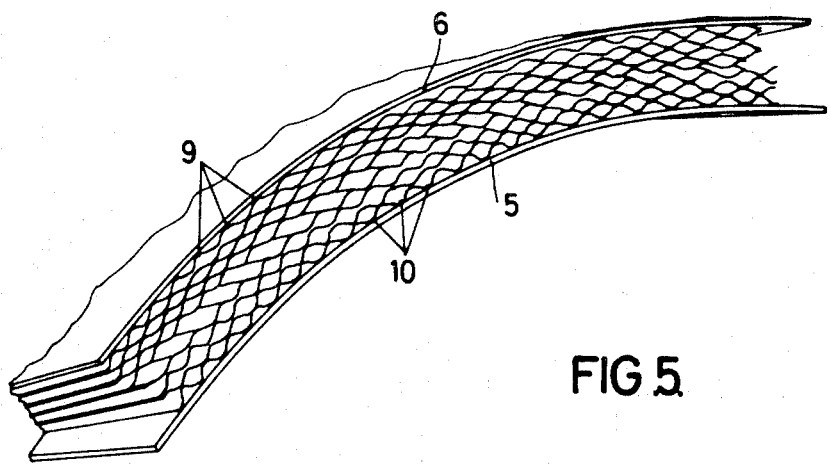
FIG. 5 is a perspective view of part of an inner conduit viewed from the open end.

FIG. 1 shows an insulating inner conduit 1 welded inside a gas conduit 2 by a continuous circumferential weld 3. The weld is made at one end of the inner conduit — i.e., that end which is upstream of the gas flow in the conduit, the flow being indicated by an arrow.

That end of the inner conduit which is welded to the tube is formed by a sheet of metal 4 suitably profiled with a step and also formed with a closure member which prevents the gas from passing through the inner conduit. The sheet of metal 4 is connected by welding to an inner cylindrical wall 5. An outer cylindrical wall 6 is also welded to the end member 4. The metal layers are therefore compressed betweeen the two cylindrical walls 5, 6 and are bounded at one end by the sheet of metal 4, the inner conduit being completely free at the other end. The axial clearance 7 between successive inner conduits both enables some of the gas contained to be evacuated during depressurisation and allows the bobbins to expand axially under heating.

The internal structure of the completely metal inner conduit is adapted to meet the following requirements: it forms an assembly of parallel insulating cells 8, each of which is closed at one end by the sheet of metal 4, while it is open at the other end adjacent the axial clearance 7; moreover, such structure has satisfactory insulating properties which substantially limit heat losses in the radial direction by irradiation, convection and conduction.

This result is obtained by superimposing a number of concentric metal layers, suitably limiting the transverse dimensions of the cells and using very thin sheet metal, having a thickness of the order of 0.1 – 0.2 mm. This structure also assures the absorption of differential expansions in the radial direction between the inner wall 5, which is subjected to elevated temperature cycles, and the outer wall 6, which remains at lower temperatures.

One advantage of the invention is that commercially available metal structures can be used. These are metal structures of thin bent and welded sheet metal which can be made of steels and rust-resistant alloys and are normally used in applications in which the weight factor is important.

FIG. 2 shows an embodiment of the structural material, formed by the superimposition of various layers of thin bent sheet metal welded along the contact zones so as to bound an assembly of, for instance, hexagonal honeycomb cells or cavities.

FIG. 3 shows another embodiment of the metal structure in which the sheet metal is not bent, but simply corrugated, the plates being welded to each other at their places of contact.

The dimensions are not restricted, since the members can have any required length, width or thickness, and the honeycombing can be of any size.

In the normally commercially available embodiments the cell size of the honeycomb structure is such as to circumscribe a circle having a diameter of 5 – 10 mm.

In a very advantageous embodiment of the invention the honeycombing is elongated in the circumferential direction — i.e., the size in the circumferential direction is greater than that in the radial direction, resulting in an improvement in the insulating properties of the structure and enabling it to deform radially.

In the various embodiments, the material used has the further advantage that, since it is very thin, the walls of the honeycombing can more readily bend to absorb thermal expansion transverse of the axes of the honeycombing. Due to the flexibility of the walls, the material can readily be curved, as shown in FIG. 4, to conform to cylindrical surfaces.

The cylindrical insulating inner conduits can therefore be readily structured by interposing between the inner tubular wall 5 and the outer tubular wall 6 one or more sections formed by suitable thicknesses of the material indicated in FIGS. 2–4 and disposed in accordance with the predetermined curvature.

The sections are cut at the ends so as to adapt themselves to the profiled sheet of metal 4 and also copy the outline of the clearance 7.

The contact zones between the structuring material and the inner and outer tubular walls 5 and 6 are then welded to one another continuously or by spot welding.

FIG. 5 shows in cutaway form a length of an insulating conduit thus formed, viewed from the end free for depressurisation — i.e., the clearance 7. The references 9 and 10 indicate the zones of contact and welding between the material of the structure and the walls 6 and 5 respectively.

Figure 6:
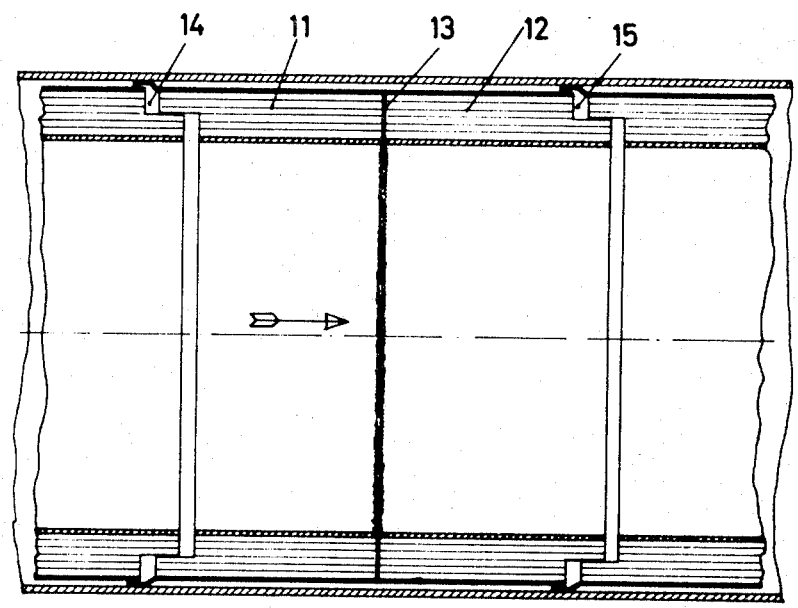
FIG. 6 is a section through the longitudinal axis of a gas conduit containing another heat insulation system according to the invention.

FIG. 6 shows a further embodiment of the invention, in which each inner conduit is formed by two halves 11, 12 straddling a circular metal ring 13 disposed between the two walls 5, 6 and forming a closure member preventing gas from passing through the gap between the walls of the inner conduit. The system is therefore depressurised at the two free ends 14, 15 of the two insulating portions 11, 12.

It will be appreciated that the invention is not restricted to the specific features of the foregoing embodiments.

I claim:

1. A heat insulation system for gas conduits having first and second conduits wherein the first conduit, through which gas flows at elevated temperatures and pressures, is positioned within and substantially coaxial with the second conduit, said first conduit comprising a plurality of aligned axially spaced of inner conduits, each having an inner and an outer wall; longitudinal cells, positioned between the inner and outer walls of said inner conduit providing a plurality of longitudinal passages said the longitudinal cells being open at one end to the gas flow in the inner conduit; and means for preventing the free flow of gas through the longitudinal passages from a position exterior of one end of the passages to a position exterior of the other end of the passages.

2. A system as claimed in claim 1, wherein the first and second conduits are pipes having a substantially circular cross-section.

3. A system as claimed in claim 1, wherein the inner conduits are spaced apart.

4. A system as claimed in claim 1, wherein said inner conduits are welded to said second conduit.

5. A system as claimed in claim 1, wherein the cells between said inner and outer walls are provided by concentric layers of metal sheeting formed into a honeycomb structure.

6. A system as claimed in claim 1, wherein the cells between said inner and outer walls are provided by concentric layers of metal sheeting welded along the lines of contact so as to bound longitudinal honeycomb spaces.

7. A system as claimed in claim 1, wherein the cells between said inner and outer walls are provided by concentric layers of metal sheeting formed into a honeycomb structure, said longitudinal passages having a circumferential length greater than a radial length.

8. A system as claimed in claim 1, wherein the cells are provided by metal elements having a thickness of 0.1 to 0.2 mm.

9. A system as claimed in claim 1, wherein said means for preventing flow comprises a single closure member extending across said passages and situated at the upstream end of said inner conduit.

10. A system as claimed in claim 1, wherein said means for preventing flow comprises a single circular ring in the central zone of said inner conduit between said inter and outer walls thereof.

11. A system as claimed in claim 1, wherein:
a. the first and second conduits are pipes having a substantially circular cross-section;
b. said inner conduits are spaced apart;
c. said inner conduits are welded to said second conduit; and
d. said cells between said inner and outer walls are provided by concentric layers of metal sheeting formed into a honeycomb structure.

* * * * *